US009640054B2

(12) United States Patent
Heine et al.

(10) Patent No.: US 9,640,054 B2
(45) Date of Patent: *May 2, 2017

(54) SYSTEM AND METHOD FOR TRACKING ITEMS STORED IN A COMPARTMENT

(71) Applicants: Robert Bosch Tool Corporation, Broadview, IL (US); Robert Bosch GmbH, Stuttgart (DE)

(72) Inventors: Christian P. Heine, Arlington Heights, IL (US); Mahendra P. Srivastava, Duluth, GA (US); James D. Bohn, Bristol, WI (US); Teresa Celmer, Bartlett, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 155 days.

This patent is subject to a terminal disclaimer.

(21) Appl. No.: 14/635,554

(22) Filed: Mar. 2, 2015

(65) Prior Publication Data

US 2015/0179036 A1 Jun. 25, 2015

Related U.S. Application Data

(63) Continuation of application No. 13/604,865, filed on Sep. 6, 2012, now Pat. No. 8,970,377.

(51) Int. Cl.
*G06Q 10/08* (2012.01)
*G01V 15/00* (2006.01)
*G08B 13/24* (2006.01)

(52) U.S. Cl.
CPC ......... *G08B 13/2462* (2013.01); *G01V 15/00* (2013.01); *G06Q 10/08* (2013.01); *G06Q 10/087* (2013.01)

(58) Field of Classification Search
None
See application file for complete search history.

(56) References Cited

U.S. PATENT DOCUMENTS 7,034,683 B2 4/2006 Ghazarian
7,225,981 B2 6/2007 Jongebloed
(Continued)

FOREIGN PATENT DOCUMENTS

EP 0706770 A2 4/1996

OTHER PUBLICATIONS

Sortimo website page, "The New LS-BOXX," published at least as early as Aug. 13, 2012 (6 pages).
(Continued)

*Primary Examiner* — Fekadeselassie Girma
(74) *Attorney, Agent, or Firm* — Maginot Moore & Beck LLP

(57) ABSTRACT

An item tracking system includes a plurality of items for storage and removal from a compartment. The system includes tags affixed to the items and configured to store identifiers for the items. A tag reader receives data from the tags in response to the items being removed from and returned to the compartment. A sensor in the compartment identifies a state change associated with the compartment. A processor identifies removal of an item with data received by the tag reader, identifies the state change with the sensor after the item is removed and before it is returned, and generates an output with an output device including the identifier corresponding to the item in response to the state change in the compartment.

21 Claims, 8 Drawing Sheets

(56) References Cited

U.S. PATENT DOCUMENTS

| | | | |
|---|---|---|---|
| 7,359,762 B2 | 4/2008 | Etter et al. | |
| 7,654,456 B2 | 2/2010 | Roewer | |
| 7,750,811 B2 | 7/2010 | Puzio et al. | |
| 7,932,812 B2 * | 4/2011 | Nerat | G06K 7/0008 340/10.1 |
| 7,969,306 B2 | 6/2011 | Ebert et al. | |
| 8,040,221 B2 | 10/2011 | Murray et al. | |
| 8,253,557 B2 * | 8/2012 | Ani | G06Q 10/08 340/539.1 |
| 2004/0069850 A1 | 4/2004 | De Wilde | |
| 2005/0103842 A1 | 5/2005 | Bong et al. | |
| 2007/0090921 A1 | 4/2007 | Fisher | |
| 2007/0164862 A1 | 7/2007 | Dhanjal et al. | |
| 2007/0200664 A1 | 8/2007 | Proska et al. | |
| 2007/0229272 A1 * | 10/2007 | Cash | G06Q 10/08 340/572.1 |
| 2008/0228346 A1 | 9/2008 | Lucas et al. | |
| 2008/0284604 A1 | 11/2008 | Rubinstein | |
| 2009/0027005 A1 | 1/2009 | Osswald et al. | |
| 2009/0040101 A1 * | 2/2009 | Ani | G06Q 10/08 342/357.61 |
| 2009/0091450 A1 * | 4/2009 | Deavila | G01S 5/0018 340/572.1 |
| 2009/0189743 A1 | 7/2009 | Abraham et al. | |
| 2009/0283590 A1 | 11/2009 | Linton et al. | |
| 2010/0019905 A1 | 1/2010 | Boddie et al. | |
| 2010/0100225 A1 | 4/2010 | Reed et al. | |
| 2010/0265061 A1 | 10/2010 | Harmon et al. | |
| 2011/0050424 A1 * | 3/2011 | Cova | G06Q 10/0833 340/572.1 |
| 2011/0087565 A1 | 4/2011 | Fan et al. | |
| 2011/0093304 A1 | 4/2011 | Nielsen et al. | |
| 2011/0175734 A1 * | 7/2011 | Sawyer | G01S 7/003 340/572.1 |
| 2011/0285536 A1 | 11/2011 | Sriharto et al. | |
| 2011/0304463 A1 * | 12/2011 | Groth | G06Q 10/087 340/572.1 |
| 2012/0041781 A1 * | 2/2012 | Louie | G06F 19/327 705/2 |
| 2012/0075071 A1 * | 3/2012 | Liu | B65D 19/001 340/10.1 |
| 2012/0092130 A1 * | 4/2012 | Chung | G08B 13/2462 340/10.1 |
| 2012/0098642 A1 | 4/2012 | Krawczewicz et al. | |
| 2012/0154124 A1 | 6/2012 | McDonald | |
| 2012/0166241 A1 | 6/2012 | Livingston et al. | |
| 2012/0191566 A1 | 7/2012 | Sayan | |
| 2012/0242453 A1 * | 9/2012 | Delgado | G06K 19/0705 340/10.1 |
| 2014/0225491 A1 * | 8/2014 | Shoenfeld | A47B 81/00 312/237 |

OTHER PUBLICATIONS

Sortimo website page, "Mobile Assortments," published at least as early as Aug. 13, 2012 (49 pages).
Ford F-150 Equipped with DeWalt and ThingMagic "Tool Link" http://www.xconony.com/boston/2008/02/07/no-more-lost-tools-for-an . . . , Feb. 7, 2008 (3 pages).
Ford DeWalt Tool Tracking, It's 5 O'Clock Do You Know Where Your Tools Are/226 Cell Phones & Mobile Device Technology News & Updates, Geek.com, Aug. 7, 2009 (10 pages).
User Guide, Document #875-0021-01, Published 2008 (39 pages).
International Search Report and Written Opinion corresponding to PCT Application No. PCT/US2013/058541, mailed Mar. 27, 2014 (15 pages).

* cited by examiner

SYSTEM AND METHOD FOR TRACKING ITEMS STORED IN A COMPARTMENT

This application is a continuation application of application Ser. No. 13/604,865, filed on Sep. 6, 2012 (now U.S. Pat. No. 8,970,377), the disclosure of such application which is totally incorporated by reference herein in its entirety.

TECHNICAL FIELD

This disclosure relates generally to item storage, inventory tracking, and inventory management systems, and, more specifically, to systems and methods for tracking items that are removed from and returned to a compartment during use.

BACKGROUND

Service workers in a wide range of industries, including construction workers, plumbers, electricians, telecommunication service personnel, and HVAC service personnel often travel to work sites to participate in work projects. Since the work sites often lack the tools and supplies required to complete a project, the workers often carry some or all of the necessary equipment in a vehicle, such as a van or work truck, to the work site. For example, a work truck often carries a wide range of tools from hammers and screwdrivers to power tools including drills, saws, belt sanders, nail drivers, and the like. Tools can include further components such as batteries, replaceable drill bits, saw blades, sanding pads, and the like, which may require occasional replacement during a job. Additionally, the work truck often includes a wide range of consumables, such as nuts, bolts, washers, screws, nails, lumber, pipe, wire, and the like, which typically remain on the work site as part of the finished project. Consumables can further include items such as water, sunscreen, stock for portable restrooms, and other products, which are consumed at the work site.

Proper organization of tools and consumables in a work vehicle and on the work site enables workers to operate more efficiently. For example, a properly organized tool system enables a worker to find an appropriate tool for a task, such as a power screwdriver, the screws properly sized to secure two structures to one another, and a screwdriver bit that fits the power screwdriver and mates with the selected screws. If any one of these items cannot be efficiently located, then time is wasted searching for the correct components to perform the task.

An example of an organizational system that enables efficient storage and access to tools and consumables is sold commercially as the Globelyst System from Sortimo International GmbH of Zusmarshausen, Germany. The Globelyst System includes a modular system of shelving and rails that holds a plurality of storage containers, which are sold commercially as L-Boxxes by Sortimo and by Robert Bosch GmBH of Stuttgart, Germany. The individual L-Boxxes lock together and engage shelves and rails in the Globelyst System to enable organization and storage of the L-Boxxes in a secure manner in the vehicle during transport. The L-Boxxes are optionally removable for convenient transport between the vehicle and the work site. The molded inserts in the L-Boxxes enable secure storage and organization of power tools within the L-Boxxes. Due to the modular design of the Globelyst System and L-Boxxes, the work vehicle can store a wide variety of different tool and consumable loads to accommodate the requirements of different projects.

While the Globelyst System is described for illustrative purposes, various other organizational systems including one or more containers, shelves, and drawers are known to the art for storage and organization of tools and consumables at a work site.

While the existing storage containers can provide organization for storing and organizing tools and consumables, the management of tools and consumables often go beyond storage and organization. For example, while containers of consumables and tools can be stored in an organized arrangement within a workshop or work vehicle, the containers and tools are often removed from the organized system and can be scattered around a work site. In a busy worksite, containers and tools can often be mislaid or stolen. Additionally, many items used at a work site should be returned to a work vehicle or other storage location at the end of each work day, but some items are often overlooked and are left vulnerable to damage or theft when the work site is not occupied. Thus, improvements to item management systems that enable improved tracking it items at work sites would be beneficial.

SUMMARY

In one embodiment, a system for tracking locations of items has been developed. The system includes a plurality of items, each item being configured to be stored and removed from a compartment, a plurality of tags affixed to the plurality of items in a one-to-one correspondence to uniquely identify each item in the plurality of items with an identifier stored in each tag, a tag reading device associated with the compartment and configured to receive data from each tag in the plurality of tags in response to each removal from and each return to the compartment of each item in the plurality of items, a sensor configured to identify a state change of the compartment, an output device, and a processor communicatively coupled to the tag reading device, the sensor, and the output device. The processor is configured to identify removal of one item in the plurality of items from the compartment with reference to the identifier stored in the tag begin received by the tag reading device, identify the state change in the compartment with the sensor after identification of the removal of the one item and without identifying that the one item has been returned to the compartment, and generate an output with the output device that includes the identifier corresponding to the one item in response to the identification of the state change in the compartment.

In another embodiment, a method for tracking locations of items has been developed. The method includes receiving, with a tag reading device associated with the compartment, data from a tag affixed to one item in response to the one item being removed from the compartment, the data from the tag including an identifier corresponding to the one item, identifying, with a processor associated with the compartment, the removal of the one item from the compartment with reference to the identifier corresponding to the one item in the data received from the tag reading device, generating, with the a sensor associated with the compartment, a signal in response to a state change in the compartment, generating, with the processor, an output message including the identifier corresponding to the one item in response to receiving the signal from the sensor without identifying a return of the one item to the compartment, and producing, with an output device, an output corresponding to the output message.

DETAILED DESCRIPTION

Figure 1:
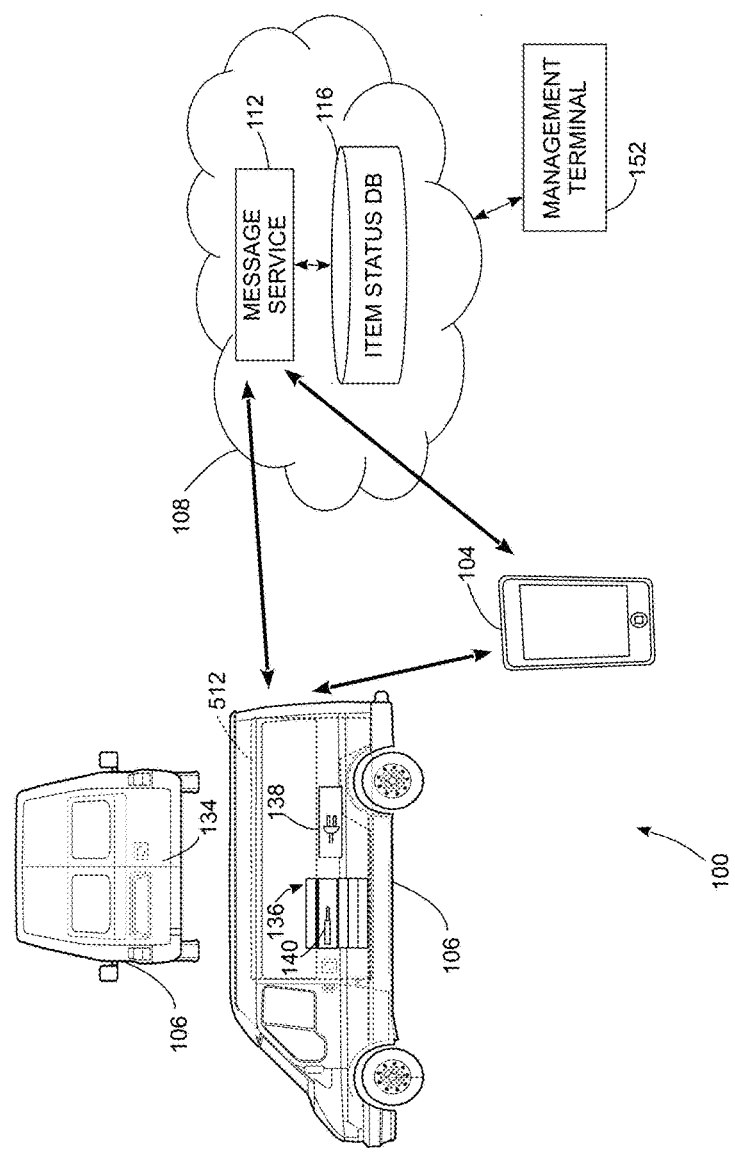
FIG. 1 is a schematic diagram of an inventory management system that tracks the presence and absence of items from a storage compartment.

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "mobile electronic device" refers to any electronic device that is configured to receive messages that identify items that are missing from a storage compartment. Examples of mobile electronic devices include, but are not limited to, smartphones, tablets, notebook computers, and the like. Another example of a mobile electronic device is a wearable computing device, such as a computing device that is integrated with a pair of glasses or other articles of clothing. The wearable computing device includes one or more sensors that read and optionally write data to tags. Still another example of a mobile electronic device is an in-vehicle computing system that displays information retrieved from tags. In some configurations, the in-vehicle computing system includes one or more tag sensors in the vehicle to read and optionally write data to tags, while other configurations include a display, such as a dashboard display, to enable a user to view tag data retrieved using another mobile electronic device such as a smartphone. The mobile electronic devices use a combination of hardware and software to receive messages, display information about the missing items, and to send messages acknowledging the missing items. Some mobile electronic device embodiments include a sensor configured to read data stored in tags that are affixed to containers and tools.

As used herein, the term "tag" refers to any device or article that is affixed to a container or tool to store data about items held in the container or about the tool. The tag stores data in a format that is readable by one or more mobile electronic devices. One type of tag includes a radio transponder with an integrated memory. Examples of radio transponder tags include radio frequency ID (RFID) and near field communication (NFC) tags. The radio transponder tags can store data that are read by a radio transceiver in the mobile electronic device. Some forms of radio transponder tags include a writeable memory that stores data transmitted from the radio transceiver in the mobile electronic device during a data write operation in addition to providing stored data to the mobile electronic device during a data read operation. Most RFID and NFC tags are referred to as "passive" tags that only operate when energized by an external sensor that supplies electrical power for the tag. Another type of tag, referred to as an "active tag" is described below for use in tracking items that are outside of the container. The active tag includes an internal electrical power source, such as a battery, and wireless transceivers that are configured to send and receive over a longer range than is typical for passive tags.

NFC tags operate using a short-range wireless communication signal, typically over a distance of several centimeters between a tag reader and a passive NFC tag that does not include a battery or independent power source. Active NFC tags include a battery or other independent power source and can communicate over longer distances. Typical NFC tags and tag sensors operate, for example, at 13.56 MHz with an over-the-air communication interface defined by the ISO/IEC 18000-3 standard. Typical NFC data transmission rates ranging from, for example, 106 kbit/s to 424 kbit/s. In general, NFC tags operate at lower radio frequencies than other forms of passive RFID that typically operate in the hundreds of megahertz or gigahertz frequency bands.

As used herein, the term "container" refers to a storage device that holds one or more items, which can include consumable items and tools that are used at a work site. A compartment in a work vehicle, tool shed, warehouse, or other structure stores one or more containers. A tag associated with the container identifies one or more types of items that are stored in the container.

As used herein, the term "tool" refers to any item used at a work site that is returned to a compartment for storage after use. Some tools are stored in a tagged container that is removed from the compartment along with the tool, while other tools include a tag that is affixed to the tool and remains affixed to the tool during use at the work site for tracking the tool individually. Cordless power tools include a battery and these tools are configured to engage a charging device in the storage compartment. Examples of tools include, but are not limited to, saws, drills, nail drivers, rotary tools, hammers, screw drivers, and the like. Tools include both power tools, which typically operate with electric, pneumatic, or hydraulic power, and unpowered tools, which are manually manipulated. Unpowered tools include, but are not limited to hand tools such as hammers and screwdrivers. Tools also include larger items such as table saws, air compressors, pumps, work benches, and any item that is carried to and from the work site.

As used herein, the term "compartment" refers to any enclosure or other structure that stores items, such as containers and tools. The containers and tools are removed and returned to the compartment during use. During operation, the compartment undergoes one or more "state changes" that can trigger an alert in an inventory management system if one or more containers or tools are absent from the compartment at the time of the state change. For example, one state change occurs when a door to the compartment is closed and locked. When a compartment is either integrated with a work vehicle or towed by the work vehicle, other state changes are possible. These other state changes include detection of vehicle movement or sensing of a vehicle transmission shifting from a park gear to a drive gear. This shifting typically occurs just prior to the vehicle being driven. As described below, an inventory management system tracks containers and tools that are stored in the compartment to ensure that the containers and tools within the containers are accounted for at the work site during state changes of the compartment.

As used herein, references to "global positioning system" (GPS) receivers refer to any device that receives signals from external transmitters to identify a geographic location of the GPS receiver. While GPS is commonly associated with the global positioning system operated by the United States Government, as used in this disclosure, the term "GPS" also refers to any equivalent system including, but not limited to, GLONASS, Galileo, and augmented GPS systems including the wide area augmentation system (WAAS) and differential GPS (DGPS) systems.

FIG. 1 depicts an inventory management system 100 that enables tracking of items as the items are removed and returned to a storage compartment. The system 100 includes at least one mobile electronic device 104, a processor and sensors integrated with a storage compartment, which is depicted as a storage compartment 512 in a vehicle 106 in FIG. 1, an inventory management server 108, a management terminal 152, a plurality of tagged containers 136 within the compartment 512, and one or more tagged tools 140 within the containers 136. FIG. 1 depicts both a side view and a rear view of the vehicle 106. The vehicle 106 includes a storage compartment 512 for the containers 136, tools 140, and charging stations 138. Doors 134 provide access to the compartment 512 to enable items to be removed and returned to the compartment 512. While FIG. 1 depicts a vehicle 106 having a compartment for storing containers and tools, other compartment embodiments include storage sheds, cages, warehouses, and any other enclosure that stores containers and tools in a secure manner.

In the inventory management system 100, the inventory management server 108 includes hardware and software to implement a message service 112 and item status database (DB) 116. In FIG. 1, the server 108 includes multiple hardware computing devices in a clustered configuration to provide scalability and fault tolerance, but a single computing device implements the functionality of the server 108 in another embodiment. The databases and services implemented in the inventory management server 108 and the operation of the remove inventory server 108 are described in more detail below.

In the inventory management server 108, the message service 112 is communicatively coupled to the mobile electronic device 104, a processor in the vehicle 106, a management terminal 152, and optionally to active tags in items stored in the vehicle 106 through a data network, such as the Internet. The vehicle processor and related components are shown and described below with reference to FIG. 5. The message service 112 receives item status update messages from the processor operating a wireless adapter in vehicle 106 in response to containers 136 and tools 140 being removed from and returned to the compartment 512. The message service 112 also receives alert messages from the mobile device 104 or the processor within the vehicle 106 in response to the state of the compartment 512 changing and one or more items being absent from the compartment 512.

The item status DB 116 includes tables and other appropriate data structures that are useful for storing information regarding the status of items associated with the compartment 512. The item status DB includes identifiers for items stored in the containers 136 and the tools 140. The identifiers in the item status DB correspond to the identifiers stored in tags in the containers 136 and tools 140, or to identifiers for the charging stations 138. The message service 112 is operatively connected to the item status DB 116, and updates the item status DB 116 in response to receiving a message from the processor in vehicle 106 that an item has been removed from or returned to the compartment 512.

In the system 100, an external management terminal 152, such as a personal computer (PC), smartphone, or tablet computer, accesses the item status DB 116 to enable a manager to review the status of items in the vehicle 106. In particular, the management terminal enables a manager to identify which items are present in the storage compartment 512 at various times as the vehicle 106 is used at the work site. Additionally, if the state of the compartment 512 changes while one or more items are absent from the compartment, the item DB is updated with an alert status and the management terminal 152 receives alert messages to inform managers about the items that are not present in the work vehicle 106. The server 108 implements a web server portal to enable the management terminal 152 to use a web browser software program to access the item status DB 116 and the other functionality of the server 108.

Figure 2:
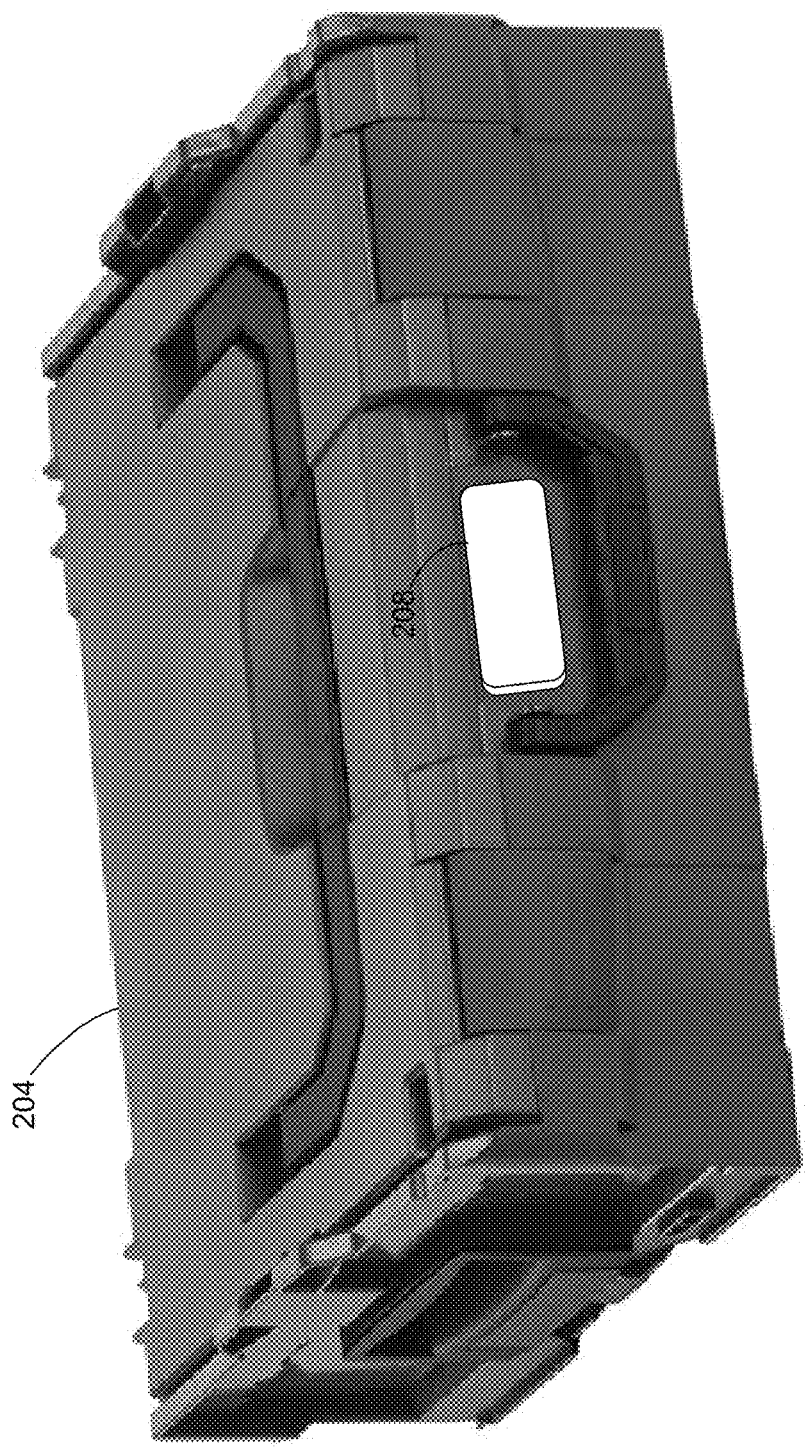
FIG. 2 is a perspective view of a tagged container holding one or more items that is stored a compartment.

In FIG. 1, the vehicle 106 carries a plurality of containers 136. FIG. 2 depicts an illustrative example of one container 204 with an active tag 208 affixed to the container 204. The container 204 is configured to interlock with other containers in the storage compartment 512 of the vehicle 106 for secure storage of the containers 136 during transport. The container 204 can be removed from the compartment 512 when the vehicle 106 is located at a work site. The active tag 208 enables the mobile electronic device 104 or management terminal 152 to query the location of the container 204 when the container 204 is outside of the compartment 512. In another configuration, a passive tag, such as an RFID or NFC tag, is affixed to the container 204, and a memory in the passive tag stores an identifier for each item stored in the container 204.

Figure 3:
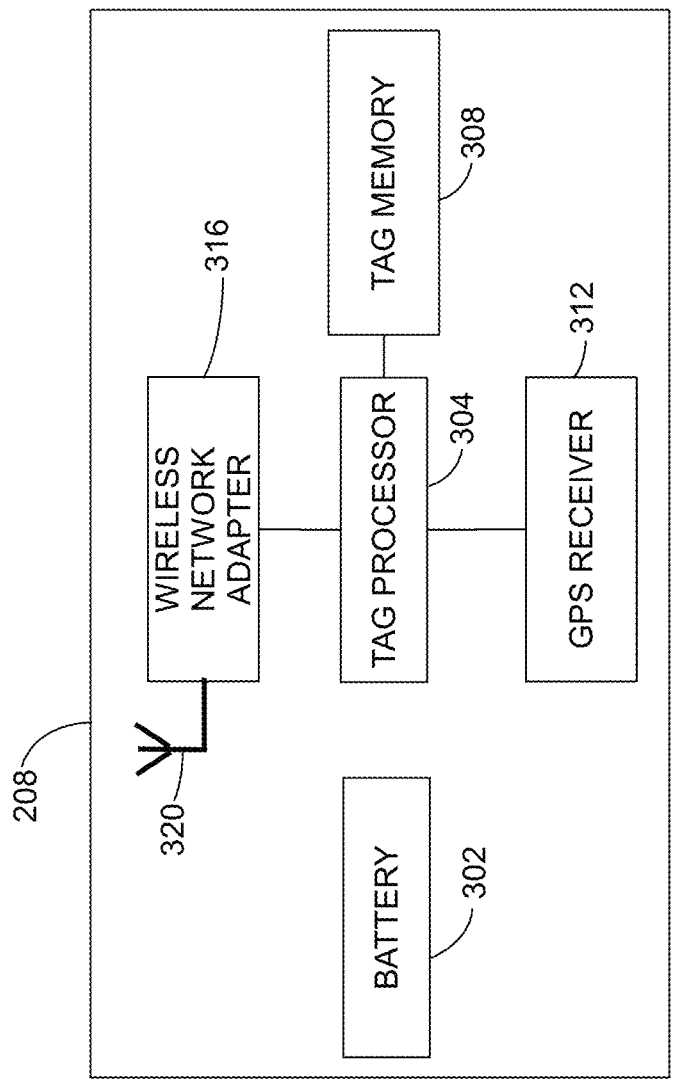
FIG. 3 is a schematic view of an active tag that is affixed to the container in FIG. 2.

The active tag 208 is configured to communicate with the inventory management server 108, vehicle processor 504, and mobile electronic device 104 over longer distances than typical passive RFID tags. FIG. 3 depicts the active tag 208 in more detail. The tag 208 includes a tag processor 304, tag memory 308, GPS receiver 312, a wireless network adapter 316, and an antenna 320. An internal battery 302 provides electrical power to the tag processor 304, tag memory 308, GPS receiver 312, and wireless network adapter 316. The tag processor 304 is typically a low-power processor that is integrated with one or more of the tag memory 308, GPS receiver 312, and wireless network adapter 316 in a system on a chip (SoC) configuration to reduce the power drawn from the battery 302. The battery 302 is recharged when the container 204 and active tag 208 are returned to the compartment 512.

In a listening mode, the tag processor 304 and wireless network adapter 316 operate in a low-power mode to receive incoming location request query messages. After receiving a location request query, the GPS receiver 312 is activated for a sufficient time to identify the location of the tag 208, and the tag processor 304 sends a response that includes the item identifier data stored in the tag memory and the location data from the GPS receiver. The processor 304 subsequently deactivates the GPS 312 and returns to the low power listening mode.

The tag processor 304 and wireless network adapter 316 are also configured to exchange data with the radio tag readers 544 in the compartment 512. Thus, the active tag 208 includes the functionality of passive tags and further enables a remote computing device, such as the mobile electronic device 104 or management terminal 152, to identify the location of the active tag 208 and container 204. Active tags, such as the tag 208, can be affixed to containers and to tools.

Figure 4:
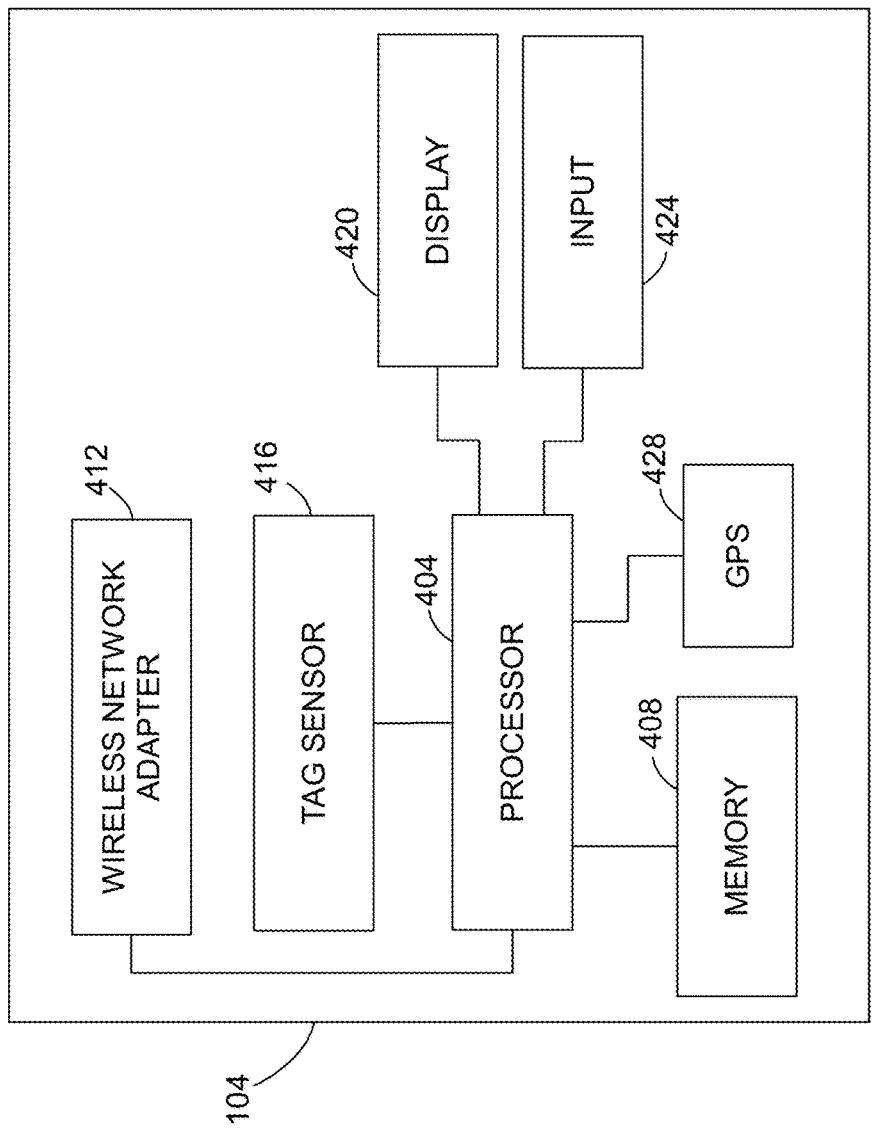
FIG. 4 is a schematic diagram of components in a mobile electronic device that is configured to operate with the system depicted in FIG. 1.

FIG. 4 depicts the mobile electronic device 104 in more detail. The mobile electronic device 104 includes a processor 404, memory 408, wireless network adapter 412, tag sensor 416, a display device 420, input device 424, and an optional global positioning system (GPS) receiver 428. The processor 404 includes one or more central processing units (CPU), graphical processing units (GPU), digital signal processors (DSP), field programmable gate arrays (FPGA), and application specific integrated circuit (ASIC) devices. The processor 404 reads and writes data from the memory 408. The memory 408 includes a non-volatile data storage device, such as solid state data storage, for long-term storage of data and instructions for software application programs, which include operating system software and software application programs that send and receive messages in the system 100. In some embodiments, the memory 408 includes volatile data storage devices, such as static or dynamic random access memory (RAM), for short-term data storage during operation. In the mobile electronic device 104, the processor 404 and other components including the memory 408, wireless network adapter 412, tag sensor 416, and GPS receiver 428 can be integrated into a single device in a SoC configuration.

In the mobile electronic device 104, the processor 404 is operatively connected to the tag sensor 416. In one configuration, the tag sensor 416 is a radio transceiver that activates a radio transponder in a tag when the tag sensor 416 is held in close proximity to the tag. The tag sensor 416 radiates a small amount of energy to provide power to the tag inductively through an antenna coil connected to the radio transponder in the tag, although some tag embodiments include an independent power source. The tag sensor 416 includes a radio transceiver that receives data stored in the tag. In some configurations, the radio transceiver in the tag sensor 416 sends data to the radio transponder in the tag as part of a query for information stored in the tag or to store new data in the tag memory.

In the mobile electronic device 104, the wireless network adapter 412 is operatively connected to the processor 404 and includes a combination of hardware and/or software modules that enable communication using one or more wireless data networks, which can include wireless wide area networks (WWAN) and wireless local area networks (WLAN). The wireless network adapter 412 enables the mobile electronic device 104 to communicate with the inventory management server 108 and the vehicle 106 in the system 100. For example, the wireless network adapter 412 receives alert messages from the vehicle 106 or inventory management server 108, and sends messages to the management server 108 that acknowledge the absence of items from the compartment in the vehicle 106.

The mobile electronic device 104 includes a display 420 and input device 424 to enable interaction with an operator in possession of the mobile electronic device 104. The display 420 typically includes a liquid crystal display (LCD) or organic light emitting diode (OLED) output panel that displays graphics, text, and other visible indicia associated with messages received from the processor in the vehicle 106 and the inventory management server 108. The input devices 424 include, but are not limited to, touch screen inputs, virtual and physical keyboards, mice, speech input and recognition systems, and the like. During operation of the mobile electronic device 104, the display 420 and input devices 424 enable operators to review and acknowledge alert messages that identify missing items from the compartment and optionally query missing items that include active tags. Additionally, the display 420 generates visual depictions of the location of missing items that include the active tags.

In the mobile electronic device 104, the optional GPS receiver 428 generates geolocation data for the mobile electronic device 104. The GPS receiver 428 generates the geolocation data with a high degree of precision. In conjunction with mapping software programs or online services, the processor 404 can automatically identify an estimated street address of the mobile electronic device 104 for identifying the location of the mobile electronic device and for identifying a relative location of a tagged item, such as a tagged container or tool, that includes an active tag configured to transmit location data to the mobile electronic device 104.

Figure 5:
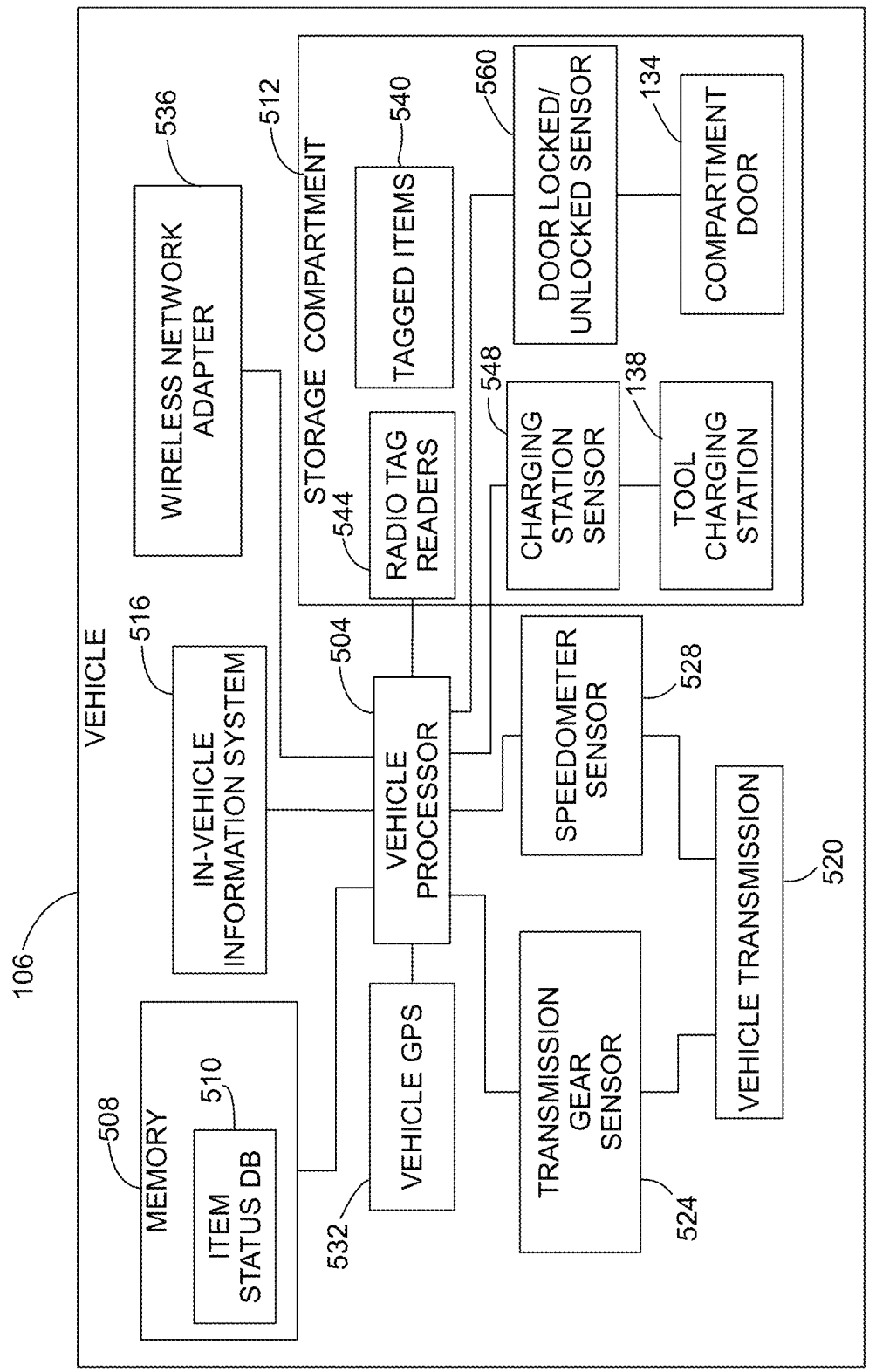
FIG. 5 is a schematic diagram of a vehicle that carries a compartment for storing a plurality of items.

FIG. 5 depicts a schematic diagram of components in the vehicle 106. The vehicle 106 includes an in-vehicle processor 504, memory 508, in-vehicle information system 516, optional vehicle GPS 532, wireless network adapter 536, and one or both of a transmission gear sensor 524 and speedometer sensor 528 coupled to the vehicle transmission 520. The storage compartment 512 holds a plurality of tagged items 540, which include the tagged containers 136 and tagged tools 140 depicted in FIG. 1. The storage compartment 512 also includes one or more tag reading devices, such as radio tag readers 544, a tool charging station 138, tool charging sensors 548, a compartment door 134, and a door locked/unlocked sensor 560.

In the vehicle 106, the processor 504 includes one or more central processing units (CPU), graphical processing units (GPU), digital signal processors (DSP), field programmable gate arrays (FPGA), and application specific integrated circuit (ASIC) devices. The processor 504 reads and writes data from the memory 508. The memory 508 includes a non-volatile data storage device, such as solid state data storage, for long-term storage of data and instructions for software application programs, which include operating system software and software application programs that send and receive messages in the system 100. In some embodiments, the memory 508 includes volatile data storage devices, such as static or dynamic random access memory (RAM), for short-term data storage during operation.

In the vehicle 106, the memory 508 further includes an item status database (DB) 510. The item status DB 510 includes tables or other appropriate data structures that are used to store identifiers for each of the tagged items 540 in a memory, and optionally store identifiers for untagged tools that are configured for use with the tool charging station 138. The item status DB 510 provides an in-vehicle record of items that are presently stored in the compartment 512 and items that have been removed from the compartment. In one embodiment, the item status DB 510 and the item status DB 116 in the inventory management server 108 store the same information for the status of the storage compartment 512. The vehicle processor 504 sends update messages to the inventory management server 108 with the wireless network adapter 536 to synchronize the data in the item status DB 510 and the item status DB 116 stored in the inventory management server 108. In another embodiment, the memory 508 does not include the item status DB 510 and the processor 504 only stores data corresponding to the status of the items in the compartment 512 in the item status DB 116 using the wireless network adapter 536.

The vehicle processor 504 is operatively connected to the radio tag readers 544. The radio tag readers 544 are distributed through the storage compartment 512 to ensure reading of data from the tags affixed to the tagged items 540 when the items 540 are removed from the compartment 512 or returned to the compartment 512. For example, the radio tag sensors can be arranged around the frame of the compartment door 134 where the items 540 enter and exit the compartment 512. In another configuration, the tag readers 544 are arranged in proximity to predetermined locations of tagged containers and tools in the compartment 512. When a tagged container or tool is removed from proximity to the corresponding radio tag reader 544, the vehicle processor 504 receives a message indicating that the item has been removed. When the item is returned, the radio tag reader 544 identifies the presence of the item, and the identity of the item from data stored in the item tag.

The vehicle processor 504 is also operatively connected to the charging station sensor 548. In the embodiment of FIG. 5, the charging station sensor 548 is an electrical continuity sensor that identifies if a tool is engaged to a corresponding connector in the tool charging station 138 for recharging. The tool charging station 138 enables the entire tool to be connected to an electrical charger without having to remove the battery from the tool. Individual connectors in the tool charging station are assigned to a single tool and the charging station sensor 548 generates signals indicating the connection or disconnection of a particular tool from the tool charging station 138. Thus, the vehicle processor 504 identifies the presence or absence of the battery powered tools using the charging station sensor 548 in addition to or instead of using the radio tag readers 544 to identify the presence or absence of the battery powered tools.

The vehicle processor 504 is configured to identify a state change in the storage compartment 512 directly or a state change in the vehicle 106 that affects the compartment 512. To that end, the vehicle processor 504 is operatively connected to the door locked/unlocked sensor 560 in the storage compartment 512, the transmission gear sensor 524, speedometer sensor 528, and the in-vehicle GPS 532 in vehicle configurations that include a GPS. The door locked/unlocked sensor 560 is coupled to a lock in the compartment door 134 and generates a signal when the compartment door 134 is locked or unlocked. As described below, a state change for the compartment 512 occurs when the compartment door 134 is locked, and the vehicle processor 504 identifies if any items are missing from the compartment 512 in response to the detection of the door being locked. The door locked/unlocked sensor 560 is also used in compartment embodiments that are fixed structures such as tool sheds, warehouses, and the like.

In the vehicle 106, the transmission gear sensor 524 and speedometer sensor 528 are both coupled to the transmission 520 and generate signals when the transmission is placed into a drive gear or when the transmission moves the vehicle, respectively. A state change occurs when either the transmission gear sensor 524 or the speedometer sensor 528 indicate that the vehicle is changing from a parked state to a driving state. The optional GPS 532 also generates data corresponding to a velocity of the vehicle in a similar manner to the speedometer sensor 528. In one configuration, the speedometer sensor 528 and GPS 532 generate a state change signal only in response to the vehicle exceeding a predetermined speed or traveling a predetermined distance. For example, if the vehicle drives at a low-speed for short distance through the work site, then the speedometer 528 and GPS 532 do not indicate a state change to prevent unnecessary generation of alert messages. Once again, the vehicle processor 504 identifies a state change when the vehicle 106 changes from a parked state to a state where the vehicle 106 is in gear to drive or is moving. The processor 504 identifies items that are missing from the compartment 512 during any of the state changes to generate alerts if the vehicle is locked or driven from the work site when items are missing from the compartment 512.

In the vehicle 106, the in-vehicle information system 516 includes devices that enable the vehicle 106 to generate alerts for the vehicle operator indicating that one or more items are missing from the storage compartment 512. In different embodiments, the in-vehicle information system 516 includes one or more of a dashboard display panel, head-up display, or audio output system with voice synthesis. The in-vehicle information system 516 enables generation of alerts to find missing items after a state change associated with the storage compartment 512.

The wireless network adapter 536 is operatively connected to the vehicle processor 504 and includes a combination of hardware and/or software modules to enable communication using one or more wireless data networks, which can include WWANs and WLANs. The wireless network adapter 512 enables the vehicle processor 504 to communicate with the inventory management server 108 and the mobile electronic device 104 in the system 100. For example, the wireless network adapter 512 sends item status update messages to the inventory management server 108 when items are removed from or returned to the storage compartment 512. The wireless network adapter 512 also sends alert messages identifying missing items to the inventory management server 108 and mobile electronic device 104 if a state change is detected when the items are not present in the compartment 512.

Figure 6:
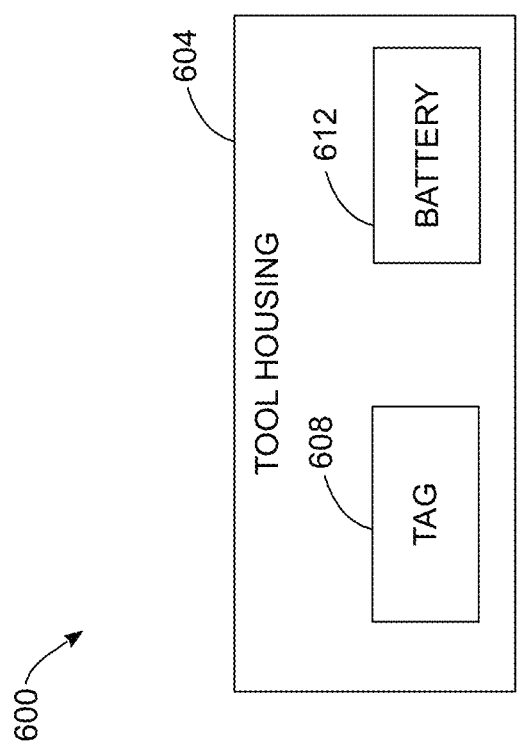
FIG. 6 is a schematic view of a tool with a tag that stores data about the tool and attachments and accessories that are used with the tool.

FIG. 6 is a schematic view of a cordless, battery powered tool 600 with an associated tag 608. In the example of FIG. 6, the tool 600 is a battery powered tool with a housing 604 that holds a battery 612. A radio-transponder tag 608, which is an NFC tag in the embodiment of FIG. 6, is affixed to the tool housing 604. The tag 608 includes a memory that stores an identifier for the tool 600. In the compartment of the vehicle 106, the radio tag reader 544 activates the tag 608 in the tool 600 when the tool 600 is removed from the compartment 512 or returned to the compartment 512. Different tool configurations include both passive tags, such as RFID and NFC tags, and active tags, such as a tag similar to the active tag 208 in FIG. 2. While the tool 600 in FIG. 6 includes the tag 608, in another embodiment the tool 600 does not include a tag. Instead, a charging station 138 in the compartment of the vehicle 106 engages the tool 600 to recharge the battery 612, and the charging station sensor 548 associated with the charger 138 identifies the presence or absence of the tool 600.

Figure 8:
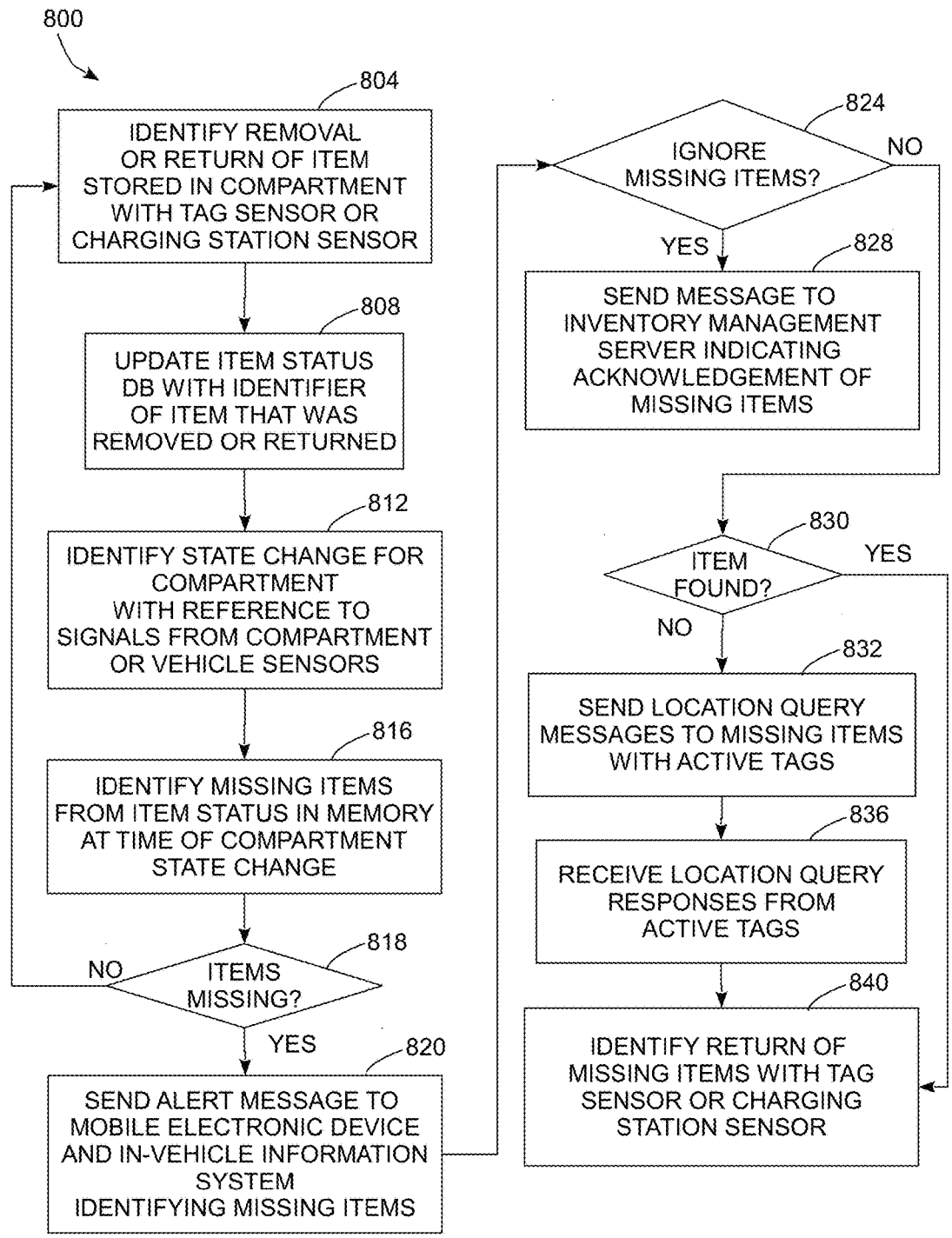
FIG. 8 is a block diagram of a process for tracking the presence or absence of items from a storage compartment.

As described above, the inventory management system 100 enables tracking of items that are removed and returned to the compartment 512. FIG. 8 depicts a process 800 for tracking the items and generating alerts if items are removed from a compartment when the state of the compartment changes. Process 800 is described in conjunction with the system 100 for illustrative purposes. In the discussion below, a reference to the process 800 performing a function or action refers to one or more processors, such as the processor 404 in the mobile electronic device 104, tag processor 304, vehicle processor 504, and processors in the server 108, executing programmed instructions stored in a memory to operate components to perform the function or action.

Process 800 begins with identification of removal of an item from the compartment or return of an item to the compartment (block 804). In the vehicle 106, the radio tag readers 544 retrieve identification data from the tag affixed to an item, such as a container or tool, as the item is removed from the compartment 512 or returned to the compartment 512. The processor 504 determines whether the item is being removed in response to the radio tag readers 544 receiving the tag data and the status for the item in the item status DB 510 indicates that the item is already stored in the container 512. Likewise, the processor 504 determines the item is being returned in response to the radio tag readers 544 receiving the tag data and the item status DB 510 indicates the item has been removed from the compartment 512. For battery powered tools that are connected to the tool charging station 138, the charging station sensor 548 generates one signal when the tool is connected to the charging station 138, and another signal when the tool is disconnected from the charging station 138, indicating presence and absence, respectively, of the tool in the compartment 512.

Process 800 continues as the vehicle processor 504 updates the item status database 510 in the memory 508 and sends a message indicating the removal or return of the item to the inventory management server 108 (block 808). In the vehicle 106, the item status DB 510 is stored in a solid-state or other non-volatile data storage device, and the vehicle processor 504 changes the status corresponding to the identifier for the item that was removed or returned to the compartment 512. The vehicle processor 504 also sends a message to the inventory management server 108 identifying the item and the updated status (present or absent from the compartment) with the wireless network adapter 536. The inventory management server 108 stores the updated status information in the item status DB 116 for review by the management terminal 152.

During process 800, multiple items can be removed and returned to the compartment 512 during operations at the work site. The inventory management system 100 records the updates to the status of the items without generating alerts until the vehicle processor 504 identifies a state change associated with the compartment (block 812). As described above, the vehicle processor 504 identifies a state change when the door locked/unlocked sensor generates a signal indicating that the compartment door 134 has been locked, when the transmission gear sensor 524 indicates that the transmission 520 has been placed into a drive gear, and when either the speedometer sensor 528 or GPS 532 indicates that the vehicle 106 is in motion. In other embodiments, a state change occurs at predetermined times, such as at the end of a work shift at the site, or when a manager operating the remote terminal 152 manually generates a state change event, such as when a work stoppage occurs due to inclement weather at the work site. The vehicle processor 504 sends a message indicating the state change, and optionally indicating the particular event that triggered the state change, to the inventory management server 108.

After identifying the state change in the compartment, the vehicle processor 504 identifies missing items from the item status DB 510 in the memory 508 at the time of the state change (block 816). In an alternative configuration, the inventory management server 108 determines whether any items are missing instead of or in addition to the vehicle processor 504 making those determinations. If no items are missing (block 818), then process 800 returns to the processor described with reference to block 804.

If one or more items are missing (block 818), then the vehicle processor 504 generates an alert message for output through the in-vehicle information system 516 and sends the alert message to either or both the mobile electronic device 104 and inventory management server 108 (block 820). In the vehicle 106, the wireless network adapter 536 transmits the output alert message to the mobile electronic device 104 and the inventory management server 108. The message includes an identification of the items that are missing.

Figure 7:
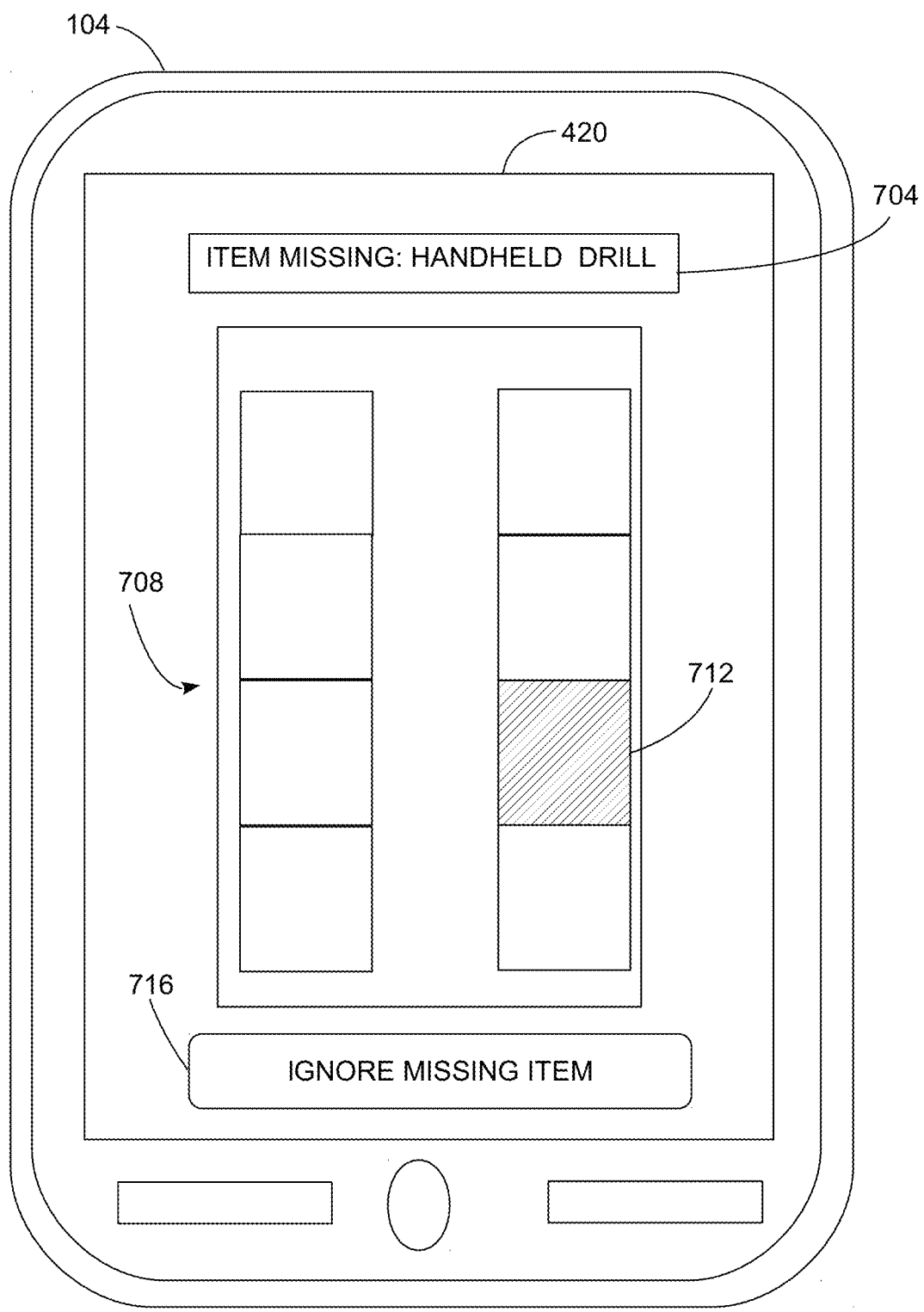
FIG. 7 is a front view of a mobile electronic device with a display screen identifying a location of a missing item in a compartment.

In one embodiment, either the in-vehicle information system or the inventory management server 108 generates a graphical depiction of items in the compartment 512 and indicates the missing item to enable an operator at the worksite to identify the missing items and the correct location in the compartment 512 for the missing items. For example, FIG. 7 depicts the mobile electronic device 104 and display 420. The display 420 generates an output including text 704 and graphical view 708 of the compartment 512 in the vehicle 106. The text 704 identifies a missing item, which is a drill in the example of FIG. 7, and the display 420 generates an overhead graphical view 708 including containers stored in the compartment 512. The indicated container 712 is the location for storing the drill in the compartment 512. In some embodiments, the in-vehicle information system 516 generates a display similar to the display depicted in FIG. 7. Additionally, the management terminal 152 receives an alert message from the inventory management server 108.

In some situations, the alert message can be ignored (block 824). For example, in some situations an item removed from the compartment 512 remains at the work site intentionally. In other situations, the work vehicle drives short distances around the work site or leaves to retrieve additional supplies and does not need to be reloaded with the items from the work site. If the alert can be ignored, the operator of the mobile electronic device 104 or in-vehicle information system 516 acknowledges the alert and either the mobile electronic device 104 or the vehicle processor 504 sends an acknowledgment message to the inventory management server 108 (block 828). Referring again to FIG. 7, an operator presses the "IGNORE MISSING ITEM" button 716 to acknowledge the alert without returning the item to the container 512.

If the alert is not ignored (block 824) then process 800 continues until the missing items are returned to the compartment 512. In many cases, the missing item is located and returned to the compartment 512 promptly (block 830). The radio tag readers 544 or charging station sensor 548 identify that the item has been returned and the vehicle processor 504 cancels the alert in response to the signals from the radio tag readers 544 or charging station sensor 548 (block 840).

In some situations, the location of a missing item is not known and the missing item is not easily located at the work site (block 830). If an active tag, such as the tag 208 depicted in FIG. 2 and FIG. 3, is affixed to the missing container or tool, then either the mobile electronic device 104, vehicle processor 504, or inventory management server sends a location request query to the active tag that is affixed to the missing item (block 832). The location request query is forwarded to a predetermined network address, such as an Internet Protocol (IP) address of the active tag through a wireless data network, such as a 3 G or 4 G WWAN or through a WLAN at the work site. The location request optionally includes authentication data that the active tag verifies to ensure that an authorized user generated the location query request.

After sending the location query message, one or more remote computing devices, such as mobile electronic device 104 or inventory management server 108, receives a location response message from the active tag (block 836). Using the tag 208 in FIG. 3 as an example, the tag processor 304 activates the GPS 312 to identify a location of the active tag 208 and container 204. The tag processor 304 generates a message including one or more item type identifiers stored in the tag memory 308 and the location data from the GPS receiver 312. The wireless network adapter 316 sends the message to one or both of the mobile electronic device 104 or inventory management server 108. In another configuration, the active tag 208 generates additional information, such as velocity information when the tag 208 is in motion.

During process 800, the mobile electronic device 104 and inventory management server 108 can generate multiple location query requests to track the active tag if the active tag and item are moving. The mobile electronic device 104 can generate a map display that depicts both the present location of the mobile electronic device 104 using data from the GPS 432, and the relative location of the active tag using the data from the location query response message. Once the missing active tag and item are located, the item is returned to the compartment 512 and the radio tag readers 544 identify that the missing item has been returned (block 840).

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A system for tracking locations of items comprising:
a plurality of items, each item being configured to be stored and removed from a compartment;
a plurality of tags affixed to the plurality of items in a one-to-one correspondence to uniquely identify each item in the plurality of items with an identifier stored in each tag;
a tag reading device associated with the compartment and configured to receive data from each tag in the plurality of tags in response to each removal from and each return to the compartment of each item in the plurality of items;
a sensor configured to identify a state change of the compartment;
an output device;
a processor communicatively coupled to the tag reading device, the sensor, and the output device, the processor being configured to:
identify removal of one item in the plurality of items from the compartment with reference to the identifier stored in the tag begin received by the tag reading device;
identify the state change in the compartment with the sensor after identification of the removal of the one item and without identifying that the one item has been returned to the compartment; and
generate an output with the output device that includes the identifier corresponding to the one item in response to the identification of the state change in the compartment;
a global positions system (GPS) receiver configured to identify a location of the one item;
a wireless network device configured to send and receive messages using a wireless data network; and
a tag processor operatively connected to the GPS receiver and the wireless network device, the tag processor being further configured to:
receive a location query message transmitted from a computing device through the wireless data network;
activate the GPS receiver to identify a location of the item in response to receiving the location query message; and
send a message including the identified location of the one item to the computing device through the wireless data network.

2. The system of claim 1, the sensor being a door lock sensor operatively connected to a lock in a door of the compartment and further configured to:
generate a signal indicating the state change in response to the door of the compartment being locked.

3. The system of claim 1, the compartment being configured to be transported by a vehicle and the sensor being one of a speedometer sensor operatively connected to a transmission and a global positioning system (GPS) sensor in the vehicle and further configured to:
generate a signal indicating the state change in response to a speed of the vehicle being greater than a predetermined threshold.

4. The system of claim 1, the compartment being configured to be transported by a vehicle and the sensor being a gear sensor operatively connected to a transmission in the vehicle and further configured to:
generate a signal indicating the state change in response to the transmission of the vehicle being placed into a drive gear.

5. The system of claim 1, the output device being a vehicle information system in a vehicle that transports the compartment.

6. The system of claim 1, the output device being a wireless network device configured to send a message including the identifier corresponding to the one item to a mobile electronic device.

7. The system of claim 6 further comprising:
a memory configured to store data corresponding to a graphical representation of the compartment and predetermined locations of the plurality of items in the compartment; and
the processor being operatively connected to the memory and further configured to:
generate a graphic of the compartment indicating the one item in the predetermined location in compartment with reference to the data corresponding to the graphical representation in the memory; and
include the graphic in the message sent to the mobile electronic device.

8. The system of claim 1 further comprising:
another wireless network device communicatively coupled to the processor; and
the processor being further configured to:
send the location query message to the tag affixed to the one item with the other wireless network device in response to the identification of the state change in the compartment with the sensor after identification of the removal of the one item and without identifying that the one item has been returned to the compartment;
receive the message including the identified location of the one item from the tag with the other wireless network device; and
generate the output including the identified location of the one item.

9. The system of claim 1, the computing device being a mobile electronic device comprising:
- another global positioning system (GPS) receiver;
- another wireless network device;
- a display device; and
- a mobile electronic device processor operatively connected to the other GPS receiver, other wireless network device, the display device, and a memory, the mobile electronic device processor being configured to execute a software application program including instructions stored in the memory of the mobile electronic device to:
    - send the location query message to the tag affixed to the one item with the other wireless network device;
    - receive the message including the identified location of the one item from the tag with the other wireless network device;
    - identify a location of the mobile electronic device with the other GPS receiver; and
    - generate the output on the display device including the identified location of the one item and the identified location of the mobile electronic device.

10. The system of claim 1 further comprising:
- an electrical charging device for a tool in the compartment;
- a charge sensor configured to indicate a presence or absence of an electrical connection between the electric charging device and a tool; and
- the charge sensor being communicatively connected to the processor, the processor being further configured to:
    - generate another output with the output device including an identifier corresponding to the tool in response to the identified state change in the compartment occurring when the charge sensor indicates the absence of the electrical connection to the tool.

11. The system of claim 1 wherein the one item is a container configured to store at least one type of consumable item.

12. The system of claim 1 wherein the one item is a container configured to store at least one tool.

13. The system of claim 1 wherein the one item is a tool and the tag remains affixed to the tool during use of the tool.

14. A method for tracking locations of items comprising:
- receiving, with a tag reading device associated with the compartment, data from a tag affixed to one item in response to the one item being removed from the compartment, the data from the tag including an identifier corresponding to the one item;
- identifying, with a processor associated with the compartment, the removal of the one item from the compartment with reference to the identifier corresponding to the one item in the data received from the tag reading device;
- generating, with the a sensor associated with the compartment, a signal in response to a state change in the compartment;
- sending, with a wireless network device communicatively coupled to the processor, a location query message to the tag affixed to the one item in response to receiving the signal from the sensor without identifying a return of the one item to the compartment;
- receiving, from another wireless network device in the tag, a location message including a location of the one item;
- generating, with the processor, an output message including the identifier corresponding to the one item and the location of the one item from the location message in response to receiving the signal from the sensor without identifying a return of the one item to the compartment; and
- producing, with an output device, an output corresponding to the output message.

15. The method of claim 14, the sensor being a door lock sensor operatively connected to a lock in a door of the compartment and the generation of the signal further comprising:
- generating, with the sensor, the signal in response to the door to the compartment being locked.

16. The method of claim 14, the compartment being configured to be transported by a vehicle and the sensor being one of a speedometer sensor operatively connected to a transmission and a global positioning system (GPS) sensor in the vehicle and the generation of the signal further comprising:
- generating, with the sensor, the signal in response to movement of the vehicle that transports the compartment.

17. The method of claim 14, the compartment being configured to be transported by a vehicle and the sensor being a gear sensor operatively connected to a transmission in the vehicle and the generation of the signal further comprising:
- generating, with the sensor, the signal in response to a shift of the transmission into a drive gear in the vehicle that transports the compartment.

18. The method of claim 14, the production of the output further comprising:
- producing the output with an information system in a vehicle that transports the compartment.

19. The method of claim 14, the production of the output further comprising:
- sending, with a wireless network device, the output message to a mobile electronic device for output on the mobile electronic device.

20. The method of claim 19 further comprising:
- retrieving, with the processor, data corresponding to a graphical representation of the compartment and predetermined locations of a plurality of items in the compartment, including the one item, from a memory;
- generating a graphic of the compartment indicating the one item in the predetermined location in compartment with reference to the data corresponding to the graphical representation in the memory; and
- including the graphic in the output message sent to the mobile electronic device.

21. The method of claim 14 further comprising:
- identifying, with a charge sensor connected to an electric charging device in the compartment, a presence or absence of an electrical connection between the electric charging device and a tool;
- generating, with the processor, another output message including an identifier corresponding to the tool in response to receiving the signal from the sensor when the charge sensor identifies the absence of the electrical connection to the tool; and
- producing, with the output device, another output corresponding to the other output message.

* * * * *